United States Patent [19]
Kristiansen

[11] 3,873,717
[45] Mar. 25, 1975

[54] CERTAIN 2,2-DIMETHYL-PROPANAL-CARBAMOYLOXIMES FUNGICIDES

[75] Inventor: Odd Kristiansen, Reinach/Baselland, Switzerland

[73] Assignee: Ciba-Geigy Corporation, Ardsley, N.Y.

[22] Filed: May 2, 1974

[21] Appl. No.: 466,330

Related U.S. Application Data

[62] Division of Ser. No. 322,584, Jan. 10, 1973, Pat. No. 3,822,359, which is a division of Ser. No. 198,420, Nov. 12, 1971, Pat. No. 3,718,683.

[30] Foreign Application Priority Data
Nov. 20, 1970 Switzerland................ 17206/70
Sept. 24, 1971 Switzerland................ 13991/71

[52] U.S. Cl. .............................................. 424/303
[51] Int. Cl. ............................................. A01n 9/14
[58] Field of Search ................................. 424/303

[56] References Cited
UNITED STATES PATENTS
3,270,054  8/1966  Gogneux et al.................... 260/456
3,674,829  7/1972  Arlt................................. 260/456

*Primary Examiner*—Vincent D. Turner
*Attorney, Agent, or Firm*—Frederick H. Rabin

[57] ABSTRACT

2,2-Dimethyl-propanal-carbamoyloximes of the formula

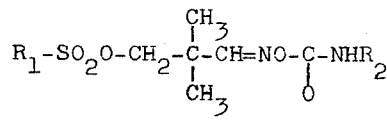

wherein
R$_1$ represents C$_1$–C$_4$ alkyl, C$_2$–C$_4$ alkenyl or phenyl and
R$_2$ represents C$_1$–C$_4$ alkyl, processes for their production and their use for pest control.

13 Claims, No Drawings

CERTAIN 2,2-DIMETHYL-PROPANAL-CARBAMOYLOXIMES FUNGICIDES

This is a division of application Ser. No. 322,584, filed Jan. 10, 1973, now U.S. Pat. No. 3,822,359 which in turn is a division of application Ser. No. 198,420, filed on Nov. 12, 1971, now U.S. Pat. No. 3,718,683.

The present invention relates to new 2,2-dimethyl-propanal-carbamoyloxime derivatives, to processes for the production thereof, and to the use of these derivatives for pest control.

The new 2,2-dimethyl-propanol-carbamoyloximes have the following formula:

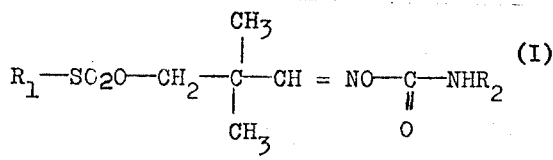

wherein
$R_1$ represents $C_1$-$C_4$ alkyl, $C_2$-$C_4$ alkenyl, or phenyl, and
$R_2$ represents $C_1$-$C_4$ alkyl.

The $C_1$-$C_4$ alkyl groups and $C_2$-$C_4$ alkenyl groups which are concerned according to the invention can be straight-chain or branched, substituted or unsubstituted. Substituents are preferably halogens such as fluorine, chlorine, bromine and/or iodine, preferably fluorine and/or chlorine.

The phenyl denoted by $R_1$ can be substituted or unsubstituted. Examples of substituents on the phenyl nucleus are: halogen such as fluoringe, chlorine, bromine and/or iodine, preferably chlorine, $NO_2$ and/or $C_1$-$C_4$ alkyl, preferably methyl. Examples of $C_1$-$C_4$ alkyl groups or $C_2$-$C_4$ alkenyl groups are, amongst others,: methyl, ethyl, (n)-propyl, isopropyl, (n)-, (i)-, (sec.)-, (tert.)-butyl, —$CF_3$, $CCl_3$, —$CH_2Cl$, Allyl, 3,3,3-trichloropropene.

Compounds preferred because of the effect they produce are compounds of formula I wherein $R_1$ represent methyl, chloromethyl, ethyl, (n)-propyl, (n)-butyl, 3,3,3-trichloropropene, 4-methylphenyl and 2,4,5-trichlorophenyl, and $R_2$ represents methyl or ethyl.

Particularly preferred are, however, compounds of formula I wherein $R_1$ represents chloromethyl, ethyl or (n)-propyl, and $R_2$ represents methyl or ethyl.

Examples of such compounds are:

3-(4'-methylphenylsulphonyloxy)-2,2-dimethyl-propanal-(N'-methylcarbamoyl)-oxime,
3-(methylsulphonyloxy)-2,2-dimethyl-propanal-(N'-methylcarbamoyl)-oxime,
3-(chloromethylsulphonyloxy)-2,2-dimethyl-propanal-(N'-methylcarbamoyl)-oxime,
3(2',4',5'-trichlorophenylsulphonyloxy)-2,2-dimethyl-propanol-(N'-methylcarbamoyl)-oxime,
3-(3',3',3'-trichloropropenesulphonyloxy)-2,2-dimethyl-propanol-(N'-methylcarbamoyl)-oxime,
3-(n-propylsulphonyloxy)-2,2-dimethyl-propanal-(N'-methylcarbamoyl)-oxime,
3-(n-butylsulphonyloxy)-2,2-dimethyl-propanol-(N'-methylcarbamoyl)-oxime,
3-(ethylsulphonyloxy)-2,2-dimethyl-propanal-(N'-methycarbamoyl)-oxime,
3-(ethylsulphonyloxy)-2,2-dimethyl-propanal-(N'-ethylcarbamoyl)-oxime,
3-(chloromethylsulphonyloxy)-2,2-dimethyl-propanal-(N'-ethylcarbamoyl)-oxime.

The compounds of formula I are produced by reacting 2-hydroxy-2,2-dimethylpropaldehyde of the formula:

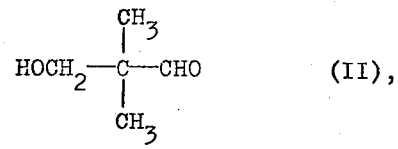

in a manner known per se, to give the oxime; converting this with a alkali isocyanate of the formula:

$$R_2NCO \qquad (III)$$

to a carbamoyloxime of the formula:

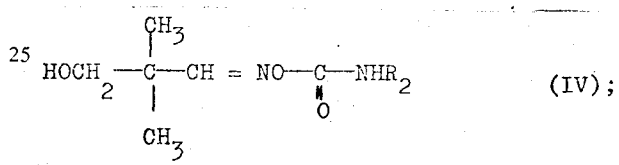

and then reacting this, in the presence of an acid-binding agent, with a sulphochloride of the formula:

$$R_1-SO_2Cl \qquad (V)$$

In the formulae II to V, $R_1$ and $R_2$ have the meanings given for the formula I.

Suitable acid-binding agents are tertiary amines, e.g. trialkylamines, pyridine, pyridine bases, dialkylanilines, etc.; also inorganic bases such as hydrides, hydroxides and carbonates of alkali metals and alkaline-earth metals. In the case of the reaction with an isocyanate of formula III, it is advisable in some cases to employ catalysts, such as, e.g. tertiary amines or organo-tin compounds.

The described process is performed in solvents or diluents inert to the reactants. Suitable in this respect are, e.g. ethers and ethereal compounds such as diethyl ether, dipropyl ether, dioxane, tetrahydrofuran; amides such as N,N-dialkylated carboxylic acid amides; aliphatic, aromatic, as well as halogenated hydrocarbons, especially benzene, toluene, xylene, chloroform, chlorobenzene, etc.; nitriles such as acetonitrile, etc.. For the production of the oxime, water and also mixtures of alkanols with water are preferred. The reaction temperatures for the production of the oxime are 20°–100°, for that of the carbamoyloxime: 0°–50°, preferably 15°–35°, and for that of the sulphonyloxycarbamoyloxime: 20°–80°.

It is known that oximes can be present in two stereoisomeric forms, namely the syn- and anti-form. Also the 2,2-dimethyl-propanal-carbamoyloxime derivatives of formula I exist in these two forms. Accordingly, the expression "2,2-dimethyl-propanal-carbamoyloxime derivatives of formula I" relates to both stereoisomeric forms in the context of the present invention.

The starting material of formula II for the reactions according to the invention is known. The carbamoyloximes of formula IV which are obtained as intermediate products have not been described hitherto.

The active substances of formula I are suitable for the control of the most diverse pests on animals and plants.

The active substances are effective, in particular, against all development stages, such as, e.g. eggs, larvae, nymphs, pupae and adults of insects and members of the order acarina, such as mites and ticks.

The compounds of formula I can be used, for example, against the following insects, or members of the order acarina: Insects of the families: Teltigonidae; Gryllidae; Gryllotalpidae; Blattidae; Peduviidae; Phyyhocoriae; Cimicidae; Delphacidae; Aphididae; Diaspididae; Pseudococcidae; Scarabaeidae; Dermestidae: Coccinellidae; Tenebrionidae; Chrysomelidae; Bruchidae; Tineidae; Noctindae; Lymatriidae; Pyralidae; Culicidae; Tipulidae; Stomoxydae; Trypetidae; Muscidae; Calliphoridae and Pulicidae; as well as acarida of the families: Ixodidae; Argasidae; Tetranychidae and Dermanyssidae.

The insecticidal or acaricidal action can be substantially broadened and adapted to suit the given conditions by the addition of other insecticides and/or acaricides.

Suitable additives are, amongst others, e.g. the following active substances:

Bis-0,0-diethylphosphoric acid anhydride (TEPP)
Dimethyl-(2,2,2-trichloro-1-hydroxyethyl)-phosphonate (TRICHLORFON)
1,2-dibromo-2,2-dichloroethyldimethylphosphate (NALED)
2,2-dichlorovinyldimethylphosphate (DICHLORVOS)
2-methoxycarbamyl-1-methylvinyldimethylphosphate (MEVINPHOS)
Dimethyl-1-methyl-2-(methylcarbamoyl)-vinylphosphate cis (MONOCROTOPHOS)
3-dimethoxyphosphinyloxy)-N,N-dimethyl-cis-crotonamide (DICROTOPHOS)
2-chloro-2-diethylcarbamoyl-1-methylvinyldimethyl-phosphate (PHOSPHAMIDON)
0,0-diethyl-0(or S)-2-(ethylthio)-ethylthiophosphate (DEMETON)
S-ethylthioethyl-0,0-dimethyl-dithiophosphate (THIOMETON)
0,0-diethyl-S-ethylmercaptomethyldithiophosphate (PHORATE)
0,0-diethyl-S-2-ethylthio)ethyldithiophosphate (DISULFOTON)
0,0-dimethyl-S-2-(ethylsulphinyl)ethylthiophosphate (OXYDEMETONMETHYL)
0,0-dimethyl-S-(1,2-dicarbethoxyethyldithiophosphate (MALATHION)
0,0,0,0-tetraethyl-S,S'-methylene-bis-dithiophosphate (ETHION)
0-ethyl-S,S'-dipropyldithiophosphate
0,0-dimethyl-S-(N-methyl-N-formylcarbamoylmethyl)-dithiophosphate (FORMOTHION)
0,0-dimethyl-S-(N-methylcarbamoylmethyl)dithio-phosphate (DIMETHOATE)
0,0-dimethyl-0-p-nitrophenylthiophosphate (PARATHION-METHYL)
0,0-diethyl-0-p-nitrophenylthiphosphate (PARATHION)
0-ethyl-0-p-nitrophenylphenylthiophosphate (EPN)
0,0-dimethyl-0-(4-nitro-m-tolyl)thiophosphate (FENITROTHION)
0,0-dimethyl-0-2,4-5-trichlorphenylthiophosphate (RONNEL)
0-ethyl-0,2,4,5-trichlorphenylethylthiophosphate (TRICHLORONATE)
0,0-dimethyl-0-2,5-dichlor-4-bromphenylthiophosphate (BROMOPHOS)
0,0-dimethyl-0-(2,5-dichlor-4-jodphenyl)-thiophosphate (JODOFENPHOS)
4-tert. butyl-2-chlorphenyl-N-methyl-0-methylamidophosphate (CRUFOMATE)
0,0-dimethyl-0-(3-methyl-4-methylmercaptophenyl)thiophosphate(FENTHION)
Isopropylamino-0-ethyl-0-(4-methylmercapto-3-methylphenyl)-phosphate
0,0-diethyl-0-p-(methylsulphinyl)phenyl-thiophosphate(FENSUTFOTHION)
0-p-(dimethylsulfamido)phenyl 0,0-dimethylthiophosphate(FAMPHUR)
0,0,0',0'-tetramethyl-0,0'-thiodi-p-phenylenthiophosphate
0-ethyl-S-henyl-ethyldithiophosphonate
0,0-dimethyl-0-(α-methylbenzyl-3-hydroxycrotonyl)-phosphate
2-chlor-1-(2,4-dichlorphenyl)vinyl-diethylphosphate(-CHLORFENVINPHCS)
2-chlor-1-(2,4,5-trichlorphenyl)vinyl-dimethylphosphate
0-[2-chlor-1-(2,5-dichlorphenyl)]vinyl-0,0-diethylthiophosphate Phenylglyoxylonitriloxim-0,0-diethylthiophosphate (PHOXIM)
0,0-diethyl-0-(3-chlor-4-methyl-2-oxo-2-H-1-benzopyran-7-yl)-thiophosphate (COUMAPHOS)
2,3-p-dioxandithiol-S,S-bis(0,0-diethyldithiophosphate (DIOXATHION)
5-[(6-chlor-2-oxo-3-benzoxazolinyl)methyl]0,0-diethyldithio-phosphate (PHOSALONE)
2-(diethoxyphosphinylimino)-1,3-dithiolane
0,0-dimethyl-S-[2-methoxy-1,3,4-thiadiazol-5-(4H)-onyl-(4)-methyl]dithiophosphate
0,0-dimethyl-S-phthalimidomethyl-dithiophosphate (IMIDAN)
0,0-diethyl-0-(3,5,6-trichlor-2-pyridyl)thiophosphate
0,0-diethyl-0-2-pyrazinylthiophosphate (THIONAZIN)
0,0-diethyl-0-(2-isopropyl-4-methyl-6-pyrimidyl)thio-phosphate (DIAZINON)
0,0-diethyl-0-(2-chinoxalyl)thiophosphate
0,0-dimethyl-S-(4-oxo-1,2,3-benzotriazin-3(4H)-ylmethyl)-dithiophosphate (AZINPHOSMETHYL)
0,0-dimethyl-S-(4-oxo-1,2,3-benzotriazin-3(4H)-ylmethyl)-dithiophosphate (AZINPHOSETHYL)
S-[(4,6-diamino-s-triazin-2-yl)methyl]-0,0-dimethyldithiophosphate (MENAZON)
0,0-dimethyl-0-(3-chlor-4-nitrophenyl)thiophosphate (CHLORTHION)
0,0-dimethyl-0(or S)-2-(ethylthioethyl)thiophosphate (DEMETON-S-METHYL)
2-(0,0-dimethyl-phosphoryl-thiomethyl)-5-methoxy-pyrone-4-3,4-dichlorbenzyl-triphenylphosphonium chloride
0,0-diethyl-S-(2,5-dichlorphenylthiomethyl)-dithiophosphate (PHENKAPTON)
0,0-diethyl-0-(4-methyl-coumarinyl-7)-thiophosphate (POTASAN)

5-amino-bis(dimethylamido)phosphinyl-3-phenyl-1,2,4-triazole (TRIAMIPHOS)
N-methyl-5-(0,0-dimethylthiolphosphoryl)-3-thiavaleramide (VAMIDOTHION)
0,0-diethyl-0-[2-dimethylamino-4-methylpyrimidyl-(6)]-thiophosphate (DIOCTHYL)
0,0-dimethyl-S-(methylcarbamoylmethyl)-thiophosphate (OMETHOATE)
0-ethyl-0-(8-quinolinyl)-phenylthiophosphonate (OXINOTHIOPHOS)
0-methyl-S-methyl-amidothiophosphate (MONITOR)
0-methyl-0-(2,5-dichlor-4-bromphenyl)-benzothiophosphate (PHOSVEL).

CARBAMIC ACID DERIVATIVES 1-naphthyl-N-methylcarbamate (CARBARYL)
2-butinyl-4-chlorophenylcarbamate
4-dimethylamino-3-tolyl-N-methylcarbamate (AMINOCARB)
4-methylthio-3,5-xylyl-N-methylcarbamate (METHIOCARB)
2-chlorophenyl-N-methylcarbamate (CPMC)
1-(dimethylcarbamoyl)-5-methyl-3-pyrazolyl-N,N-dimethylcarbamate (DIMETHILAN)
2,3-dihydro-2,2-dimethyl-7-benzofuranyl-N-methylcarbamate (CARBOFURAN)
2-methyl-2-methylthiopropionaldehyde-0-(methylcarbamoyl)-oxime (ALDICARB)
8-quinaldyl-N-methylcarbamate and salts thereof
3-isopropyl-5-methylphenyl-N-methylcarbamate (PROMECARB)
2-(1,3-dioxolan-2-yl)-phenyl-N-methylcarbamate (DIOXACARB)
2-(4,5-dimethyl-1,3-dioxalan-2-yl)-phenyl-N-methylcarbamate
2-(1,3-dithiolan-2-yl)-phenyl-N-methylcarbamate
2-(1,3-dithiolan-2-yl)-phenyl-N,N-dimethylcarbamate
2-isopropoxyphenyl-N-methylcarbamate (APROCARB)
4-diallylamino-3,5-xylyl-N-methylcarbamate (ALLYXICARB)
1-isopropyl-3-methylpyrazol-5-yl-N,N-dimethylcarbamate (ISOLAN)
1-methylthioethylimino-N-methylcarbamate (METHOMYL)
2-[propargylethylamino]-phenyl-N-methylcarbamate
2-[propargylmethylamino]-phenyl-N-methylcarbamate
2-[dipropargylamino]-phenyl-N-methylcarbamate
3-methyl-4-[dipropargylamino]-phenyl-N-methylcarbamate
3,5-dimethyl-4-[dipropargylamino]-phenyl-N-methylcarbamate
2-[allylisopropylamino]-phenyl-N-methylcarbamate

NITROPHENOLS AND DERIVATIVES 4,6-dinitro-6-methylphenol, Na-salt [Dinitrocresol]
dinitrobutylphenol-(2,2',2''-triethanolamine salt 2-cyclohexyl-4,6-dinitrophenol [Dinex]
2-(1-methylheptyl)-4,6-dinitrophenyl-crotonate [Dinocap]
2-sec.-butyl-4,6-dinitrophenyl-3-methyl-butenoate [Binapacryl]
2-sec.-butyl-4,6-dinitrophenyl-cyclopropionate
2-sec.-butyl-4,6-dinitrophenylisopropylcarbonate [Dinobuton]

MISCELLANEOUS pyrethin I
pyrethin II
3-allyl-2-methyl-4-oxo-2-cyclopenten-1-yl-chrysanthemumate (Allethrin)
6-chloriperonyl-chrysanthemumate (Barthrin)
2,4-dimethylbenzyl-chrysanthemumate (Dimethrin)
2,3,4,5-tetrahydrophthalimidomethylchrysanthemumate
4-chlorobenzyl-4-chlorophenylsulphide [Chlorbensid]
6-methyl-2-oxo-1,3-dithiolo-[4,5-b]-quinoxaline [Quinomethionate]
(1)-3-(2-furfuryl)-2-methyl-4-oxocyclopent-2-enyl(1)-(cis + trans)-chrysanthemum-monocarboxylate [Furethrin]
2-pivaloyl-indane-1,3-dione [Pindon]
N'-(4-chloro-2-methylphenyl)-N,N-dimethylformamidine (Chlorphenamidin)
4-chlorobenzyl-4-fluorophenyl-sulphide (Fluorbenside)
5,6-dichloro-1-phenoxycarbanyl-2-trifluoromethyl-benzimidazole (Fenozaflor)
p-chlorophenyl-p-chlorobenzenesulphonate (Ovex)
p-chlorophenyl-benzenesulphonate (Fenson)
p-chlorophenyl-2,4,5-trichlorophenylsulphone (Tetradifon)
p-chlorophenyl-2,4,5-trichlorophenylsulphide (Tetrasul)
p-chlorobenzyl-p-chlorophenylsulphide (Chlorbenside)
2-thio-1,3-dithiolo-(,5-6)-quinoxaline (Thiochinox)
prop-2-ynyl-(4-t-butylphenoxy)-cyclohexysulphite (Propargil).

Furthermore, the new compounds of formula I possess extraordinarily good nematicidal properties, and can be used, for example, for the control of the following plant-parasitic nematodes: *Meloidogyne spp., Heterodera spp., Ditylenchus spp., Pratylenchus spp., Paratylenchus spp., Anguina spp., Helicotylenchus spp., Tylenchlorhynchus spp., Rotylenchulus spp., Tylenchulus semipentrans, Radopholus similus,, Belonolaismus spp., Trichodorus spp., Longidorus spp., Aphelenchoides spp., Xyphinema spp.*.

In addition to possessing the above mentioned properties, the compounds of formula I exhibit, applied in very small amounts, a favourable degree of effectiveness against members of the class Thallophyta.

Thus, some of these compounds have a bactericidal action. They are, however, particularly effective against fungi, especially against the phytopathogenic fungi belonging to the following classes, orders or species.

Oomycetes, such as *Plasmodiphora*-species, *Aphanomyces*-species, *Pythium*-species, *Phytophthora*-species, e.g. (*Phytophthora infestans, Phytophthora cactorum, Plasmopara*-species, e.g. (*Plasmopara viticola*), *Bremia*-species (*Bremia lactucae*), *Peronospora*-species, e.g. (*Peronospora tabacina*), *Pseudo-peronospora*-species, e.g. (*Pseudoperonospora humuli*).

Zygomycetes, such as *Rhizopus*-species.

Ascomycetes, such as *Eurotiales*, such as *Aspergillus*-species, *Penicillium*-species, e.g. (*Penicillium digitatum, Penicillium italicum*), Taphrinales, such as *Taphrina*-species, e.g. (*Taphrina deformans*), Erysiphales, such as *Erysiphes*-species, e.g. (*Erysiphes Cichoracearum, Erysiphes graminis*), *Podosphaera leucotricha, Sphaerotheca*-species (*Spherotheca pannosa*), *Uncinula*-species (*Uncinula necator*), Helotiales, such as *Monilinia*-species (*Monilinia [Sclerotinia] fructicola, Monilinia laxa*), *Diplocarpon*-species (*Diplocarpon rosae*), *Pseudopeziza*-species, Sphaeriales, such as *Netria*-species (*Nectria galligena*), *Ceratocystis*-species, Pseudosphaeriales, such as *Venturia*-species, (*Venturia inaequalis*), *Mycosphaerella*-species, *Ophiobolus*-species (*Ophiobolus graminis*), *Cochliobolus*-species ([*Helminthosporium*] *miyabeanus*), *Cercospora*-species (*Cercospora beticola, Cercospora musae*).

Basidiomycetes, such as *Aphyllophorales*, *Pellicularia*-species, e.g. (*Pellicularia filamentora* = [*Rhizoctonia solani*]), *Uredinales* such as *Pucccinia*-species, e.g. (*Puccinia triticina*), *Uromyces*-species (*Uromyces phaseoli*), *Hemileia*-species (*Hemileia vastatrix*), *Cronartium*-series (*Cronarthium ribicola*), *Phragmidium*-species (*Phragmidium subcorticium*), *Gymnosporangium* species.

Denteromycetes = (*Fungi impertecti*) such as *Piricularia*-species, e.g. (*Piricularia oryzae*), *Corynespora*-species, *Thielaviopsis*-species. *Clasterosporium*-species, *Botrytis*-species (*Botrytis cinerea*), *Cladosporium*-species, *Alternaria*-species (*Alternaria solani*), *Verticillium*-species (*Verticillium alboatrum*), *Phialophora*-species, *Melanconiales*, such as *Colletotrichum*-species, *Fusarium*-species, such as (*Fusarium oxysporum, Fusarium nivale*), *Gloesporium*-species (*Gloesporium fruchtigenum*), *Sphaeropsidales*, e.g. *Septoria*-species (*Septoria apicola*), *Diplodia*-species (*Diplodia natalensis*), *Mycelia sterilia*, e.g. *Sclerotium* series (*Sclerotium rolfsii*).

The compounds of formula I likewise have a fungitoxic action in the case of fungi which attack the plants from the soil and cause, in some cases, tracheomycose, such as, e.g. *Fusarium cubense, Fusarium dianthi, Verticillium alboatrum* and *Phialophora cinereceus*.

Moreover, the new active substances can be used for the treatment of seeds, fruit, tubers, etc., for the protection against fungus infections, e.g. as a result of smut fungi of all kinds, such as:

Ustilaginales such as *Ustilago*-species (*Ustilago avenae*), *Tilletia*-species (*Tilletia tritici*), *Urocystis*- and *Tuburcinia*-species, *Phoma*-species (*Phoma betae*).

By virtue of their biocidal properties, the compounds of formula I are suitable for disinfection, and for the protection of diverse materials againt infestation by bacteria and fungi. It is shown to be in this respect particularly advantageous that the compounds of formula I, in concentration such as are required for disinfection and for the protection of materials, have no toxic side effects in the case of warm-blooded animals.

The compounds of formula I can be mixed, besides with the mentioned insecticides and acaricides, with other fungicides, fungistitica or bacteriostatica in various mixture ratios, the compound mixtures thus obtained having advantages compared with the individual constituents. The following are, for example, suitable for being made up with the active substance of formula I:

dodecylguanidineacetate (DODINE),
pentachloronitrobenzene (QUINTOZENE),
pentachlorophenol (PCP),
2-(1-methyl-n-propyl)-4,6-dinitrophenyl-2-methylcrotonate (BINAPACRYL),
2-(1methyl-n-heptyl-4,6-dinitrophenylcrotonate (DINOCAP),
2,6-dichloro-4-nitroaniline (DICHLORAN),
2,3,5,6-tetrachlorobenzoquinone (1,4) CHLORANIL),
2,3-dichloronapthoquinone (1,4) DICHLONE),
N-(Trichloromethylthio)-phthalimide (FOLPET),
N-(trichloromethylthio)cyclohex-4-ene-1,2-dicarboximide (CAPTAN),
N-(1,1,2,2-tetrachloroethylthio)cyclohex-4-ene-1,2-dicarboximide (CAPTAFOL),
N-methanesulphonal-N-trichloromethylthio-chloroaniline,
N'-dichlorofluoromethylthio-N-dimethyl-n'-phenylsulphamide (DICHLORFLUAMID),
O-ethyl-S-benzyl-phenyldithiophosphate,
O,O-diethyl-S-benzyl-thiolphosphate,
disodium-ethylene-1,2-bis-dithiocarbamate (NABAM),
zinc-ethylene-1,2-bis-dithiocarbamate ZINEB),
manganese (II)-ethylene-1,2-bis-dithiocarbamate MANEB)
tetamethylthiuramdisulphide THIRAM)
1-oxy-3-acetyl-6-methyl-cyclohexene-(5)dione-(2,4) (DEHYDROACETIC ACID),
8-hydrooxyquinilone (8-QUINOLINOL),
2-dimethylamino-6-methyl-5-n-butyl-4-hydroxypyrimidine,
methyl-N-benzimidazol-2-yl-N-(butylcarbamoyl)carbamate (BENOMYL),
2-ethylamino-6-methyl-5n-butyl-4-hydroxypyrimidine,
2,3-dicyano-1,4-dithia-anthraquinone (DITHIANON),
2-(4-thiazolyl)-benzimidazole,
3,5-dimethyltetrahydro-1,3,5-thiadiazine-2-thione (DAZOMET),
2,3-dihydro-5-carboxanilido-6-methyl-1,4-oxathine,
pentachlorobenzyl alcohol.

The compounds of formula I can be used on their own or together with suitable carriers and/or additives. Suitable carriers and additives may be solid or liquid, and correspond to the substances common in formulation practice, such as, e.g. natural and regenerated substances, solvents, dispersing agents, wetting agents, adhesives, thickeners, binders and/or fertilisers.

For application, the compounds of formula (I) can be processed into the form of dusts, emulsion concentrates, granulates, dispersions, sprays, solutions or suspensions, the formulation of these preparations being effected in a manner commonly known in practice. Also to be mentioned are cattle dips and spray races, in which aqueous preparations are used.

For the control of pests present in the soil, the new active substances are applied in the form of solid or liquid agents. For application to the soil, such agents are particularly advantageous which ensure a uniform distribution of the active substances through a layer of soil extending to a dpeth of 15 to 25 cm. The mode of application and the form of application are governed, in particular, by the type of soil pests to be controlled, by the climate, and by the conditions of the soil. Since the new active substances are not phytotoxic and do not impair germination power, they may be used, without the observance of a waiting period, directly before or after the sowing of the plants. It is likewise possible to treat already existing plant cultivations with the new agents. Furthermore, the active substances can be applied just to the parts of the plants above the soil.

The agents according to the invention are produced in a manner known per se by the intimate mixing and/or grinding of active substances of formula I with the suitable carriers, optionally with the addition of dispersing agents or solvents which are inert to the active substances. The active substances can be obtained and used in the following preparation forms:

| | |
|---|---|
| solid preparations: | dusts, scattering agents, granulates, coated granulates, impregnated granulates and homogeneous granulates; |
| liquid preparations: | |
| a) water-dispersible active substance concentrates: | wettable powders, pastes, emulsions; |
| b) solutions. | |

The solid preparations (dusts, scattering agents) are produced by the mixing of the active substances with solid carriers. Suitable carriers are, e.g. kaolin, talcum, bole, loess, chalk, limestone, ground limestone, Atta-clay, dolomite, diatomaceous earth, precipitated silicic acid, alkaline-earth silicates, sodium and potassium aluminum silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

Granulates can be very easily produced by dissolving an active substance of formula I in an organic solvent, applying the thus obtained solution to a granulated mineral, e.g. attapulgite, $SiO_2$, granicalcium, bentonite, etc., and then evaporating off the organic solvent.

It is also possible to produce polymer granulates by the mixing of the active substances of formula I with polymerisable compounds (urea/formaldehyde; dicyanodiamide/formaldehyde, melamine/formaldehyde or others), and the carrying out then of a careful polymerisation, by which process the active substances remain unaffected, and whereby granulation is undertaken during gel formation. It is more favourable to impregnate finished porous polymer granulates (urea/formaldehyde, polyacrylonitrile, polyesters and others) having a specific surface and a favourable predeterminable adsorption/desorption ratio, the impregnation being effected with the active substances, e.g. in the form of their solutions (in a low-boiling solvent), and the solvent then removed. Such polymer granulates can also be spread, in the form of microgranules having a bulk weight of preferably 300 g/litre to 600 g/litre, with the aid of powder sprayers. The spraying can be carried out over extensive areas of useful plant cultivations by means of aeroplanes.

Granulates are also obtainable by compacting of the carrier material with the active substances and the additives, and subsequent grinding.

To these mixtures can also be added additives stabilising the active substance, and/or non-ionic, anion-active and cation-active substances which, for example, improve the adhesiveness of the active substances on plants and parts of plants (adhesives and agglutinants), and/or ensure better wettability (wetting agents) and dispersibility (dispersing agents).

The following substances are, for example, suitable: olein/lime mixture, cellulose derivatives (methyl cellulose, carboxymethyl cellulose), hydroxyethylene glycol ethers of mono- and dialkylphenols having 5 to 15 ethylene oxide radicals per molecule and 8 to 9 carbon atoms in the alkyl radical, ligninsulphonic acid, the alkali metal and alkaline-earth metal salts thereof, polyethylene glycol ethers (carbowaxes), fatty alcohol polyglycol ethers having 5 to 20 ethylene oxide radicals per molecule and 8 to 18 carbon atoms in the fatty alcohol moiety, condensation products of ethylene oxide, propylene oxide, polyvinylpyrrolidones, polyvinyl alcohols, condensation products of urea/formaldehyde, as well as latex products.

Water-dispersible concentrates of active substances, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents.

The wettable powders and pastes are obtained by the mixing and grinding of the active substances with dispersing agents and pulverulent carriers, in suitable devices, until homogeneity is obtained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalene sulphonic acids with phenol and formaldehyde, as well as alkali, ammonium and alkaline-earth metal salts of ligninsulphonic acid, also alkylarylsulphonates, alkali metal salts and alkaline-earth metal salts of dibutylnaphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary ethylene glycols, dialkyl dilauryl ammonium chloride, and fatty acid alkali metal and alkaline-earth metal salts.

Suitable anti-foam agents are, e.g. silicones.

The active substances are so mixed, ground, sieved and strained with the above mentioned additives that the solid constituent in the case of wettable powders has a particle size not exceeding 0.02 to 0.04 mm, and in the case of pastes not exceeding 0.03 mm. For the preparation of emulsion concentrates and pastes, dispersing agents are used such as those mentioned in the preceding paragraphs, organic solvents and water. Suitable solvents are, e.g. alcohols, benzene, xylene, toluene, dimethylsulphoxide, and mineral oil fractions boiling in the range of 120° to 350°C. The solvents must be practically odourless, non-phytotoxic, and inert to the active substances.

Furthermore, the agents according to the invention can be used in the form of solutions. For this purpose, the active substance (or several active substances) of the general formula I is (or are) dissolved in suitable organic solvents, solvent mixtures, or water. As organic solvents it is possible to use aliphatic and aromatic hydrocarbons, their chlorinated derivatives, alkylnaphthalenes, mineral oils on their own or in admixture with each other.

The content of active substance in the above described agents is between 0.1 and 95 percent; it is to be mentioned in this connection that in the case of application of the agents from an aeroplane, or by means of some other suitable application devices, concentrations of up to 99.5 percent can be used, or even the pure active substance itself.

The active substances of formula I can be prepared e.g. as follows:

Dusts

The following substances are used for the preparation of a) a 5% dust, and b) a 2% dust:

a) 5 parts of active substance,
   95 parts of talcum.
b) 2 parts of active substance,
   1 part of highly dispersed silicic acid,
   97 parts of talcum.

The active substances are mixed and ground with the carriers.

The following substances are used to produce a 5 % granulate:

```
5       parts of active substance
0.25    parts of epichlorhydrin,
0.25    parts of cetyl polyglycol ether,
3.50    parts of polyethylene glycol,
91      parts of kaolin (particle size 0.3 - 0.8 mm).
```

The active substance is mixed with epichlorhydrin and dissolved with 6 parts of acetone; the polyethylene glycol and cetyl polyglycol ether and then added. The thus obtained solution is sprayed on to kaolin, and the acetone subsequently evaporated in vacuo.

Wettable powder

The following constituents are used for the preparation of a) a 40%, b) and c) a 25%, and d) a 10% wettable powder:

```
a)  40    parts of active substance,
     5    parts of sodium lignin sulphonate,
     1    part of sodium dibutyl-naphthalene sulphonate,
    54    parts of silicic acid.
b)  25    parts of active substance,
     4.5  parts of calcium lignin sulphonate
     1.9  parts of Champagne chalk/hydroxyethyl cellulose
          mixture (1:1),
     1.5  parts of sodium dibutyl naphthalene sulphonate,
    19.5  parts of silicic acid,
    19.5  parts of Champagne chalk,
    28.1  parts of kaolin.
c)  25    parts of active substance,
     2.5  parts of isooctylphenoxy-polyoxyethylene-ethanol,
     1.7  parts of Champagne chalk/hydroxyethyl
          cellulose mixture (1:1),
     8.3  parts of sodium aluminium silicate,
    16.5  parts of kieselguhr,
    46    parts of kaolin.
d)  10    parts of active substance,
     3    parts of a mixture of the sodium salts of
          saturated fatty alcohol sulphates,
     5    parts of naphthalenesulphonic acid/formaldehyde
          condensate,
    82    parts of kaolin.
```

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates

The following substances are used to produce a) a 10% and b) a 25% emulsifiable concentrate:

```
a)  10     parts of active substance,
     3.4   parts of epoxidised vegetable oil,
    13.4   parts of a combination emulsifier consisting
           of fatty alcohol polyglycol ether and alkylaryl-
           sulphonate calcium salt,
    40     parts of dimethylformamide,
    43.2   parts of xylene.
b)  25     parts of active substance acid ester,
     2.5   parts of epoxidised vegetable oil,
    10     parts of an alkylarylsulphonate/fatty alcohol-
           polyglycol ether mixture
     5     parts of dimethylformamide,
    57.5   parts of xylene.
```

From these concentrates it is possible to produce, by dilution with water, emulsions of any desired concentration.

Spray

The following constituents are used to prepare a 5% spray:

```
5 parts of active substance,
1 part of epichlorhydrin,
94 parts of benzine   (boiling limits 160°-190°C).
```

EXAMPLE 1 a. A solution of 30.6 g of potassium hydroxide in 500 ml of water is added dropwise at 5°–10°, with stirring, to a mixture of 423 g of 2,2-dimethylpropanal, 556.5 g of formalin and 900 ml of water. Stirring is continued overnight, and the reaction mixture is subsequently repeatedly extracted with diethyl ether. The organic phases are dried, the solvent evaporated, and the residue fractionated in vacuo. The obtained 3-hydroxy-2,2-dimethylpropanal (cp. C.A. 65, 13529e (1966)) boils at 86°–91°/13 Torr.

b. A solution of 82.5 g of sodium carbonate in 260 ml of water is added dropwise at room temperature, with stirring, to a mixture of 108 g of hydroxylamine hydrochloride, 132 g of 3-hydroxy-2,2-dimethylpropanal and 260 ml of water. The reaction mixture is refluxed for 3 hours, and subsequently extracted with diethyl ether. The organic phase is dried and the solvent evaporated. The obtained 3-hydroxy-2,2-dimethylpropanal-oxime is further reacted without purification.

c. 350 ml of absolute diethyl ether and 350 ml of absolute benzene are mixed, and 117 g of 3-hydroxy-2,2-dimethylpropanal-oxime dissolved therein. To this solution is added dropwise at room temperature, with stirring and within 30 minutes, a solution of 76 ml of methylisocyanate in 130 ml of absolute benzene. The whole is stirred for 18 hours, after which the precipitated product is filtered off, and washed with a mixture of 500 ml of diethyl ether/100 ml of benzene. Thus obtained is 3-hydroxy-2,2-dimethyl-propanal-(N'-methylcarbamoyl)-oxime, which melts at 107°–110°.

d. A solution of 51.4 g of ethylsulphochloride in 50 ml of absolute benzene is added at room temperature, with stirring and within one hour, to a solution of 69.6 g of 3-hydroxy-2,2-dimethylpropanal-(N'-methylcarbamoyl)-oxime and 40.4 g of triethylamine in 600 ml of absolute benzene. Stirring is continued for a further hour at room temperature, and subsequently for 2 ½ hours with refluxing. After cooling, the reaction mixture is washed with water and diluted hydrochloric acid; the organic phase is then dried and the solvent evaporated off. The residue is washed with 100 ml of cold diethyl ether. Thus obtained is 3-(ethylsulphonyloxy)-2,2-dimethylpropanal-(N'-methylcarbamoyl)-oxime, M.P.: 52°–53°.

The following compounds too are produced in an analogous manner:

| | M.P. °C |
|---|---|
| 3-(4'-methylphenylsulphonyloxy)-2,2-dimethyl-propanal-(N'-methylcarbamoyl)-oxime | 102 – 104 |
| 3-(methylsulphonyloxy)-2,2-dimethyl-propanal-(N'-methylcarbamoyl)-oxime | 76 – 77 |
| 3-(chloromethylsulphonyloxy)-2,2-di-methyl-propanal-(N'-methylcarbamoyl)-oxime | 62 – 64 |
| 3-(2',4',5'-trichlorophenylsulphonyloxy)-2,2-dimethyl-propanal-(N'-methylcarbamoyl)-oxime | 141 |
| 3-(3',3',3'-trichloropropenesulphonyloxy)-2,2-dimethyl-propanal-(N'-methylcarbamoyl)-oxime | 135–136 |
| 3-(n-propylsulphonyloxy)-2,2-dimethyl-propanal-(N'-methylcarbamoyl)-oxime | 70 – 72 |
| 3-(n-butylsulphonyloxy)-2,2-dimethyl-propanal-(N'-methylcarbamoyl)-oxime | 72 – 76 |
| 3-(ethylsulphonyloxy)-2,2-dimethyl-propanal-(N'-ethylcarbamoyl)-oxime | |
| 3-(chloromethylsulphonyloxy)-2,2-dimethyl-propanal-(N'-ethylcarbamoyl)-oxime | |

EXAMPLE 2

Nematocidal test

To test the action against soil nematodes, the active substance is added, in the stated concentration, to soil infested by root-gall nematodes (*Meloidogyne arenaria*), and the whole intimately mixed. In the test series A (Table 1), tomato seedlings are planted immediately in the thus prepared soil; and in the test series B (Table 2), tomatoes are sown therein after a waiting period of 8 days.

The galls present on the roots are counted 28 days after planting and after sowing, the results being then used as a basis for the assessment of the nematocidal action.

| Evaluation: | |
|---|---|
| 0 = | full nematocidal action = no infestation, |
| 5 = | no nematocidal action = the same infestation as in the case of the control test, |
| 1–4 = | intermediate stages of infestation. |

Test series A (Table 1)

| Active substance | Nematocidal action | |
|---|---|---|
| | 50 ppm | 10 ppm |
| 3-(Methyl-sulfonyl-oxy)-2,2-dimethyl-propanal-(N'-methylcarbamoyl)-oxime | 2 | — |
| 3-(Ethyl-sulfonyl-oxy)-2,2-dimethyl-propanal-(N'-methylcarbamoyl)-oxime | 1 | 2 |
| 3-(Chlormethyl-sulfonyl-oxy)-2,2-dimethyl-propanal-(N'-methylcarbamoyl)-oxime | 0 | 2 |
| Tetrahydro-3,5-dimethyl-2H-1,3,5-thiadiazine-2-thione (known from Chem. Week No. 12.4.69, p. 56) | 5 | 5 |

Test series B (Table 2)

| Active substance | Nematocidal action | |
|---|---|---|
| | 50 ppm | 10 ppm |
| 3-(Methyl-sulfonyl-oxy)-2,2-dimethyl-propanal-(N'-methylcarbamoyl)-oxime | 0 | — |
| 3-(Ethyl-sulfonyl-oxy)-2,2-dimethyl-propanal-(N'-methylcarbamoyl)-oxime | 0 | 0 |
| 3-(Chlormethyl-sulfonyl-oxy)-2,2-dimethyl-propanal-(N'-methylcarbamoyl)-oxime | 0 | 1 |
| Tetrahydro-3,5-dimethyl-2H-1,3,5-thiadiazine-2-thione (known from Chem. Week No. 12.4.69, p. 56) | 3 | 5 |

EXAMPLE 3

Action Against Ticks

A. *Rhipicephalys bursa*

Small glass tubes each contain either 5 adult ticks or 50 tick larvae and the glass tubes are immersed for 1 or 2 minutes in 2 ml of an aqueous emulsion from a dilution series comprising dilutions of 100, 10, 1, and 0.1 ppm of test substance. The glass tube is then closed with a standardised cotton plug and inverted, so that the active substance emulsion can be absorbed by the cotton wool.

The assessment of the results in the case of the adults is made after 2 weeks, and in the case of the larvae after 2 days. Two repeats of each test are made.

B. *Boophilus microplus* (Larvae)

With a dilution series analogous to that in test A, tests are carried out using in each case 20 larvae sensitive to OP and 20 OP-resistant larvae (The resistance relates to the compatibility with respect to Diazinon). The compounds according to Example 1 exhibit in these tests a good degree of effectiveness against adults and larvae of *Rhipicephalus bursa*, and against larvae of *Boophilus microplus*.

EXAMPLE 4

Acaricidal action

An infested piece of leaf from a mass culture of *Tetranychus urticae* is placed, 12 hours before the test, onto *Phaseolus vulgaris* (kidney beans). The transferred mobile stages are sprayed from a chromatography sprayer with the emulsified test preparations, this being effected without any running down of the spray emulsion. Larvae, adults and eggs are examined under a binocular after two to seven days in order to assess the number of living forms and dead forms, the result being then expressed as percentages. During the "holding time," the treated plants are kept in greenhouse compartments at 25°C.

The compounds according to Example 1 have an excellent action in the above test against adults, larvae and eggs of *Tetranychus urticae*.

EXAMPLE 5

Insecticidal stomach poison action

Tobacco and potato plants are sprayed with a 0.05% aqueous active substance emulsion (obtained from a 10% emulsifiable concentrate).

After the drying of the coating, Egyptian cotton-leaf worms (*Spodoptera litoralis*) are placed onto the tobacco plants, and Colorada beetle larvae (*Leptinotarsa decemlineata*) onto the potato plants. The test is performed at 24° with 60 percent relative humidity.

Systemic insecticidal action

To establish the systemic action, rooted bean plants (*Vicia fabae*) are placed into a 0.01% aqueous active substance solution (obtained from a 10% emulsifiable concentrate). After 24 hours, aphids (*Aphis fabae*) are placed on the parts of the plants above the soil. The insects are protected by a special device from the effect of contact and of gas. The test is carried out at 24° with 70% relative humidity.

The compounds according to Example 1 display in the above tests a good insecticidal stomach poison action and systemic insecticidal action.

EXAMPLE 6

Fungicidal action a. Action against Botrytis cinerea on Vicia faba

In Petri dishes lined with moistened filter paper were placed, in each dish, three fully developed and equally large *Vicia faba* leaves, these having been sprayed with a spraying apparatus until dripping wet with a solution (0.1% active substance content) prepared with the active substance made up as a 10% wettable powder. When the leaves were again dry, they were infected with a freshly prepared standardised spore suspension of the fungus (concentration: 100,000 spores/ml), and kept for 48 hours in a moist atmosphere at 20°C. The leaves displayed after this period of time black, initially point-like spots, which rapidly spread. The number and size of the infection points served as a criterion in assessing the effectiveness of the test substance.

b. Action against *Erysiphe cichoracearus* on *Cucumis sativus*

After being sprayed with a 0.1% suspension of the active substance prepared as a wettable powder, and after the drying of the sprayed-on coating, young *Cucumis sativus* plants were sprayed with a spore suspension of the fungus. After the plants had been in a greenhouse for 8 days at ca. 23°C, an assessment was made of the degree of infection (proportion on leaf surface covered with the mycelium) on the infected treated leaves in comparison with that present on the untreated infected control specimens.

c. Action against *Uromyces appendiculates* on *Phaseolus vulgaria*

*Phaseolus vulgaris* plants in the two-leaf stage were sprayed dripping wet with a suspension of the active substance (conc.: 0.1% of active substance) made up as a wettable powder. After the drying of the sprayed-on coating, the plants were infected with a fresh spore suspension of bean rust, and subsequently kept for one day in a moist chamber, and then for 12 days in a greenhouse at 20°– 22°C.

The number and size of the rust spots served as a criterion in the assessment of the effectiveness of the test substances.

d. Action against *Phytophthora infestans* on *Solanum Lycopersicum*

*S. Lycopersicum* plants of the same type and in the same development stage were sprayed in the dry state, after having been previously sprayed with a solution of 0.1% of active substance (produced from the active substance in the form of a wettable powder), with a zoosporesuspension of *Ph. infestans* until dripping wet. The plants then remained for 6 days in a greenhouse at 18° –20°C with high humidity (95–100 percent), and were displaying after this period of time typical leaf spots. The assessment of the tested substance was made on the basis of the number and size of the spots.

e. Action against *Podesphaera leucotricha* (Ell.et Ev.) Salm. on small apple trees Apple-cuttings of the type MM 111 were grown during the test in a greenhouse at 20°C with 90% relative humidity. When 3 to 4 leaves had unfolded on each of the developing lateral shoots, the leaves were sprayed dripping wet with a spray solution prepared from the active substance made up as a 10% wettable powder (solution: 0.1% active substance content). After the drying of the sprayed-on coating, the leaves were evenly sprayed on the upper side with a spore-solution of the fungus.

The small apple trees were again sprayed with the above described active substance preparation at intervals of 7 and 14 days after the initial treatment. The evaluation of the test results was made 12 days after the last treatment.

The assessment of the effectiveness of the test substance was made on the basis of the number and size of the points of infection.

f. Action against *Plasmopara viticola* (Bert. et Curt.) (Berl. et DeToni) on grape-vines Grape-vine cuttings of the type "Chasselas" were grown in a greenhouse. In the 10-leaf stage, 3 plants were sprayed dripping wet with a spray solution of the active substance formulated as a 10% wettable powder (0.1% active substance content of the solution). After the drying of the sprayed-on coating, the plants were uniformly infected on the underside of the leaves with the spore-suspension of the fungus. The plants were subsequently kept for 8 days in a moist chamber. There were signs of infection on the control plants after this period of time. The assessment of the effectiveness of the test substance was made on the basis of the number and size of the areas of infection.

g. Action against *Septoria apicola Spegazzini* on Celery plants

Celery of the type "Challon" was grown in a greenhouse. The young plants, each fifteen centimetres high, were sprayed until dripping wet with a spray solution (0.1% active substance content) prepared from the active substance made up as a 10% wettable powder. After the drying of the sprayed-on coating, the plants were infected with a sporesuspension of the fungus. After 2 days in a moist chamber, and 12 days at 20°–22°C with 90 percent relative humidity in a greenhouse, symtoms of infection appeared. The number and size of the points of infection serves as a criterion in the assessment of the effectiveness of the test substance.

h. Action against *Erysiphe graminis* DC. on Triticum

In a greenhouse at 20°C, young wheat plants approximately 10 cm in length were sprayed dripping wet with a spray solution (0.1% active substance content) prepared from the active substance made up as a 10% wettable powder. After the drying of the sprayed-on coating, the plants were infected with conidia of the fungus. The percentage infestation of the plants was determined after 12 days (greenhouse 20°C).

i. Action against *Puccinia triticina Eritess* on Triticum

In a greenhouse at 20°C, young wheat plants approximately 10 cm in length were sprayed until dripping wet with a spray solution (0.1% active substance content) prepared from the active substance made up as a 10% wettable powder. After the drying of the sprayed-on coating, the plants were uniformly infected with a uredospore suspension of the fungus. After 5 days in a humid chamber and 12 days in a greenhouse at 20°–22°C with normal relative humidity, an assessment of the test results was made. The number and size of the points of infection served as a criterion in the assessment of the effectiveness of the test substance.

The compounds according to Example 1 exhibited in the above tests a) to i) a good fungicidal action.

I claim:

1. A method for combatting phytophathogenic fungi which comprises applying to an area infested with said fungi a fungicidally effective amount of a compound of the formula

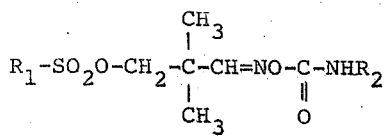

wherein $R_1$ represents $C_1$–$C_4$ alkyl, $C_1$–$C_4$ haloalkyl, $C_2$–$C_4$ alkenyl or phenyl optionally substituted by halogen, nitro or $C_1$–$C_4$ alkyl, and $R_2$ represents $C_1$–$C_4$ alkyl.

2. The method according to claim 1 in which $R_1$ represents methyl, chloromethyl, ethyl, n-propyl, n-butyl, 3,3,3-trichloropropenyl, 4-methylphenyl or 2,4,5-trichlorophenyl, and $R_2$ represents methyl or ethyl.

3. The method according to claim 2 in which $R_1$ represents chloromethyl, ethyl or n-propyl.

4. The method of claim 3 in which the compound is 3-(ethylsulphonyloxy)-2,2-dimethyl-propanal-(N'-methylcarbamoyl)-oxime.

5. The method of claim 2 in which the compound is 3-(4'-methylphenylsulphonyloxy)-2,2-dimethyl-propanol-(N'-methylcarbamoyl)-oxime.

6. The method of claim 2 in which the compound is 3-(methylsulphonyloxy)-2,2-dimethyl-propanal-N'-methylcarbamoyl)-oxime.

7. The method of claim 3 in which the compound is 3-(chloromethylsulphonyloxy)-2,2-dimethyl-propanal-(N'-methylcarbamoyl)-oxime.

8. The method of claim 2 in which the compound is 3-(2',4',5'-trichlorophenylsulphonyloxy)-2,2-dimethyl-propanal-(N'-methylcarbamoyl)-oxime.

9. The method of claim 2 in which the compound is 3-(3',3',3'-trichloropropenesulphonyloxy)-2,2-dimethyl-propanal-(N'-methylcarbamoyl)-oxime.

10. The method of claim 3 in which the compound is 3-(n-propylsulphonyloxy)-2,2-dimethyl-propanal-(N'-methylcarbamoyl)-oxime.

11. The method of claim 2 in which the compound is 3-(n-butylsulphonyloxy)-2,2-dimethyl-propanol-(N'-methylcarbamoyl)-oxime.

12. The method of claim 3 in which the compound is 3-(ethylsulphonyloxy)-2,2-dimethyl-propanal-(N'-ethylcarbamoyl)-oxime.

13. The method of claim 3 in which the compound is 3-(chloromethylsulphonyloxy)-2,2-dimethyl-propanal-(N'-ethylcarbamoyl)-oxime.

* * * * *